United States Patent [19]
Hitchner

[11] Patent Number: 6,128,543
[45] Date of Patent: Oct. 3, 2000

[54] METHOD AND APPARATUS FOR COLLECTING MANUFACTURING EQUIPMENT DOWNTIME DATA

[76] Inventor: Jim Hitchner, P.O. Box 6813, San Rafael, Calif. 94903

[21] Appl. No.: 09/104,052

[22] Filed: Jun. 24, 1998

[51] Int. Cl.⁷ .............................. G06F 17/60; G06F 19/00; G06G 7/66
[52] U.S. Cl. .............................. 700/108; 700/79; 700/174
[58] Field of Search .......................... 701/114; 706/912; 700/79, 80, 174, 175, 108, 111

[56] References Cited

U.S. PATENT DOCUMENTS

| | | | |
|---|---|---|---|
| 4,654,806 | 3/1987 | Poyser et al. | 364/528.27 |
| 4,977,516 | 12/1990 | Shepard . | |
| 4,985,857 | 1/1991 | Bajpai et al. . | |
| 5,052,630 | 10/1991 | Hinsey et al. | 241/36 |
| 5,123,017 | 6/1992 | Simpkins et al. . | |
| 5,285,494 | 2/1994 | Sprecher et al. . | |
| 5,311,562 | 5/1994 | Palusamy et al. . | |
| 5,327,349 | 7/1994 | Hoste | 364/468.17 |
| 5,502,543 | 3/1996 | Aboujaoude . | |
| 5,566,092 | 10/1996 | Wang et al. . | |
| 5,617,342 | 4/1997 | Elazouni . | |

*Primary Examiner*—Paul P. Gordon
*Assistant Examiner*—Iván Calcano
*Attorney, Agent, or Firm*—Larry D. Johnson

[57] ABSTRACT

A method and apparatus for collecting manufacturing equipment downtime data which electrically blocks stopped equipment (production) from restarting until an acceptable reason (either by code or direct identification) has been entered and recognized by an electronic logic system. Locking out the restart capability until the downtime cause has been entered ensures that the causes for all downtimes are recorded in a timely fashion. This data is gathered and recorded to measure and define explanations for lost equipment running time. Other related data may also be gathered.

11 Claims, 2 Drawing Sheets

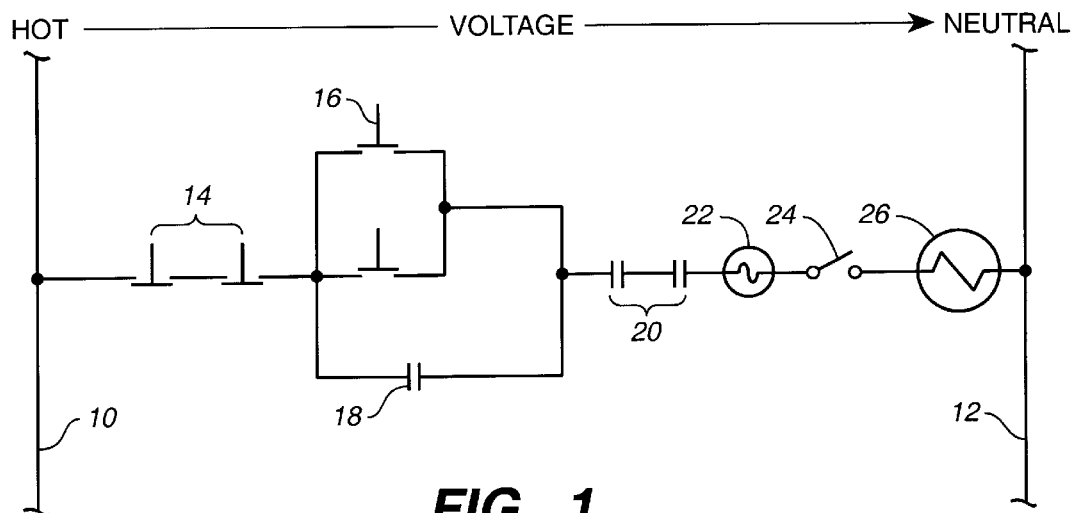
FIG._1
*(PRIOR ART)*
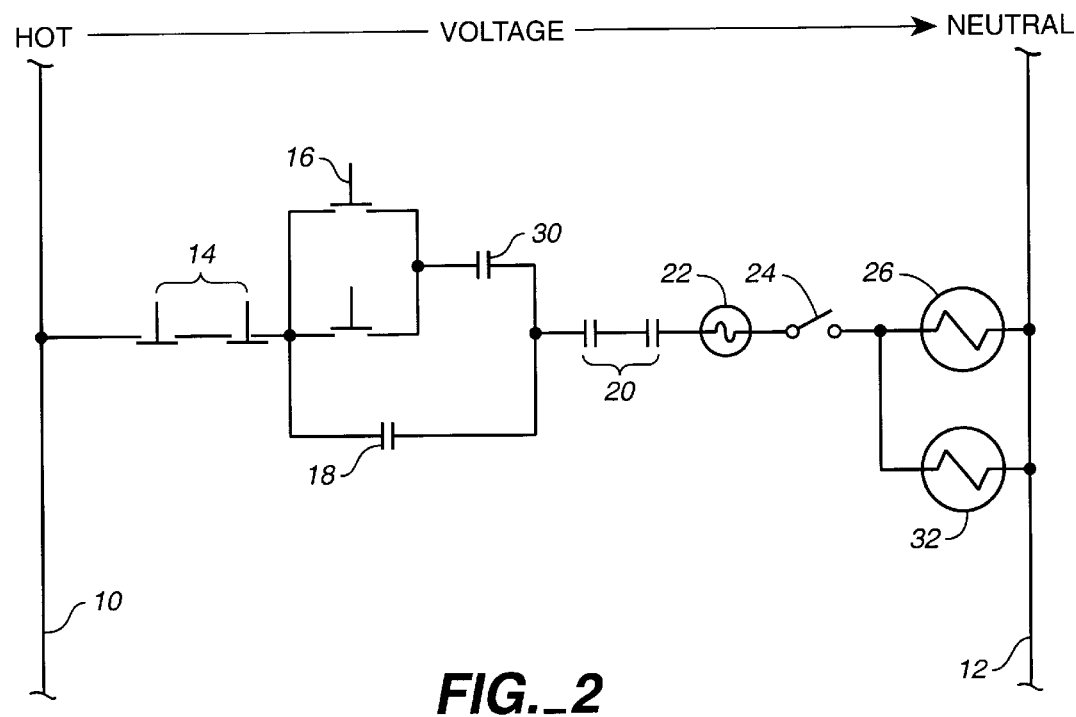
FIG._2

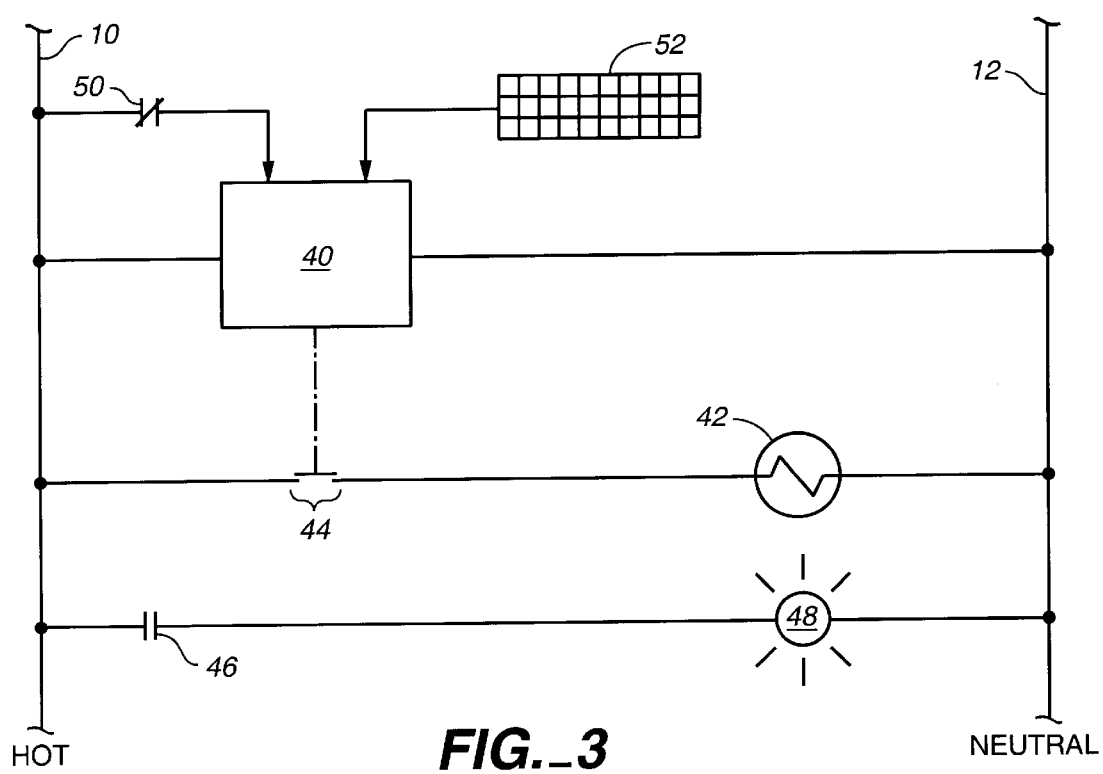
FIG._3

METHOD AND APPARATUS FOR COLLECTING MANUFACTURING EQUIPMENT DOWNTIME DATA

BACKGROUND OF THE INVENTION

1. Field of the Invention

This invention relates generally to industrial manufacturing processes, and more specifically to an improved method and apparatus for collecting data relative to manufacturing equipment downtime.

2. Description of the Prior Art

Known industrial manufacturing production processes typically consist of multiple steps, or stages, to produce a given product. Many, if not all, of the stages include power usage for the control of each process step. This power usage can be logged to generate a record as to when the process step was operational, and when it was not.

When the manufacturing equipment is not running it is referred to as "downtime". Downtime can either be planned (e.g., no work, nighttime, etc.) or unplanned (e.g., mechanical breakdowns, spills, etc.). In some situations, the cause of the downtime may be logged by hand by the operator into batch records (where such batch records are kept).

At other times, the cause for a given downtime may be deciphered from the downtime pattern, if it is distinctive. Or, the cause of the downtime may exist only in the minds of the operations people, and subject to their powers of recall. There is no known on-the-fly dedicated system that exists for data gathering of downtime causes.

Although major unplanned downtimes can be dramatic enough to attract corrective action, cumulative smaller downtime losses can escape unnoticed. Knowledge of all downtime stoppages, their causes, duration and summation of this information would encourage corrective action to be taken (or not taken), so that operating efficiencies could be maximized. Furthermore, the effectiveness of corrective measures could be quantified.

SUMMARY OF THE INVENTION

The present invention provides a method and apparatus for collecting manufacturing equipment downtime data. Stopped manufacturing equipment is electrically blocked from restarting (or mechanically blocked with electric controls) until an acceptable reason has been entered (either by code or direct verbiage identification) and recognized by an electronic logic system. Locking out the restart capability until the downtime cause has been entered ensures that the causes for all downtimes are recorded in a timely fashion.

Typically, this restart prevention consists of controlling a process motor or device, but customizing may be necessary depending on the situation. For instance, an electric eye may be installed across a conveyor line to detect downtime of product flow, because product can bunch up (like on a bottle packaging line) and stop production even though the conveyor motor is still running. This may also include a new gate device to block movement until a proper code has been entered. Other mechanical blocks may be utilized, such as (but not limited to) a clutch plate added to a drive shaft. However, the concept is the same. Normal manufacturing operations cannot continue after stoppage until an acceptable code for downtime has been entered by the operator. This data may then be gathered and recorded to measure and define explanations for lost equipment running time. Other related data may also be gathered.

The present invention is in essence a functional operations meter. As such, it can be used as a comparator to measure the benefit (or, conversely, the detriment) of various operational conditions. Presently, for example, raw material specification ranges, process parameters and system procedures are largely determined by empirical means. The present invention can be used to define peak operational conditions more precisely and more easily than prior methods. Provisions are included in the invention to accept external data for comparative use.

For example, raw material specifications are typically set by the raw material vendor who defines normal production standards. As best as possible the performance range is evaluated by the purchasing factory, but rarely are the extremes of range available for evaluation. This method is often accepted as being economically "good enough".

With the passage of time, raw material specifications may drift around (within their range, or drift in an unspecified condition). This change can damage (or possibly even improve) the end product. If the impact is dramatic enough for detection, the raw material specification can be tightened back (or written in for the first time if it did not previously exist). This can increase the raw material cost. However, this new, tighter range can be quantifiably compared to performance for a more precise evaluation as described in the following two paragraphs. This has traditionally been determined largely by empirical estimations.

The present invention includes provisions for adding reject counts and unit costs to determine reject material cost. This is usually known with reasonable accuracy before raw material specs are changed. Total loss/unit made is equal to reject material costs/unit made added to downtime labor costs/unit made. Since downtime losses are known with greater precision with the method of this invention, a more precise total loss can be determined (or more easily determined). A curve can be generated by plotting total losses/unit made against raw material specification values. The integral under the curve over any range represents the losses per units made over the selected range.

The tighter the raw material specification range, the more (generally) the raw material will cost. To ascertain whether to pay a higher price for a tighter range for a raw material the invention will support the following format: The loss per unit made from each lot that used the raw material within the selected narrow range are added together. This total is divided by the number of lots used for data to determine the average loss per unit made while staying within the tighter specification. This process is repeated to determine the (higher) average loss per unit made while operating within the wider window raw material specification. Finally, the ratio of the higher raw material cost per unit made divided by the normal (broad-band) raw material cost per unit made is multiplied times the average loss per unit made at the tighter specification range (to account for the price differential). The lower average cost is the most profitable choice.

In addition to raw material issues, system changes can impact on productivity. Presently, many system changes are made intuitively. A simplistic example would be to move a toolbox closer to the operator or mechanic. It is often difficult to measure the impact of a small system change like this amidst the amalgamation of the "big picture" of a full production line.

The present invention allows the purported improvement to be quantified by measuring before and after performance. Since the invention is downtime-specific, appropriate downtime data can be segregated to magnify performance. In the toolbox example only repair downtimes likely to be affected would be displayed (by total/unit time and average time/incident) using before and after data.

Sometimes these intuitive "improvements" are subtly counter-productive. Because the present invention can define downtime so specifically, other local increases of lost productivity can be identified and reviewed for any possible association with the initial system change. In the toolbox example, the closer location could be blocking the flow of material downstream, which would show up as increased downtime at the downstream station.

Process changes can also be measured for impact. As an example, if line speed were increased, the curve of actual total costs per unit made would first show the downward slope of reduced production costs per unit made (due to the faster line speed); followed by a reversal of slope direction upward of increased production losses per unit made (due to inefficiencies of the higher speed). Peak productivity occurs where the slope is minimal ($D_y/D_x=0$). Presently this is determined mostly by empirical means. This invention refines the precision, and/or makes the determination easier to define.

Novel features of the inventive method and apparatus include, but are not limited to, the following:

A. Forced manual prompt for downtime cause. The method of data entry is unique.

B. Downtime reports (with causes) for normal industrial production, as opposed to mere productivity reports.

Everyone is aware of downtime; it's that which reduces productivity. If downtime did not exist, nothing would ever go wrong and total output would equal theoretical production rate times time worked. Downtime is the "friction" that prevents production from being perfect. Intuitively, if one measures productivity, it would seem that there is no apparent reason to measure downtime, because it is simply that amount which is missing from productivity. However, tracking downtime allows its causes and categories to be tagged with it. Displaying downtimes by various assorted flags is diagnostically useful for reducing and eliminating an appropriate portion of it. Itemized downtime reports can be used to diagnostically reduce downtime.

C. Unlike other existing systems dedicated to specific uses, the diagnostic solutions are not spoon-fed to a machine over wires. This invention has a more generic concept to make an affordable production management system available to most all industries. Management people (human beings) have to look at the data produced by this invention for trends, totals, causes, etc. Then they must decide what corrective actions they want to take. This is the way that business has always been run. Industry gathers the best data they can afford and makes the best decision they can. This invention gives businesses better data at an affordable price. (The cost is affordable because of its design and pre-packaged software core.) As may be readily appreciated, the present invention provides data regarding mechanical and non-mechanical causes of downtime. For example, in a downtime data environment, data that underlies and generates management decisions regarding employee participation in the production process is considered to be of a non-mechanical nature. Non-mechanical downtime data includes categories such as staff training needs and placement, human error, and planned downtimes (for such things change over and set up), as is set forth below in paragraphs E, F, and I.

D. Further separation of downtime data into subdivisions of planned and unplanned downtime events. Pre-splitting downtime into planned and unplanned categories enables evaluation of preventive and non-preventive measures.

E. Allocation of downtime data sorted by employee numbers to detect a need for additional training and/or for best staff placement of employees (an algorithm may be written to do this automatically).

F. Downtime causes created by human blunders escape other systems. Because they do not lend themselves to electrical sensor input, automation cannot cope with this non-electrical event, yet during many production operations human problems may account for more than half of the outages. Of even greater significance, these represent perhaps the most preventable of the downtime events.

G. The key downtime data (cause) is fed immediately to the computer as it happens.

H. The quality of productivity data will be more accurate, because existing productivity reports can mask downtime amounts and causes. Downtime reports display all the "bad news". But, only if one knows what the "bad news" is can anything be done to prevent it. Many production rates can be "pumped up" for short bursts to mask a downtime event. Then management does not know that a faster rate may be possible, and they do not know that something went wrong that might need to be changed so it does not happen again. This does require management to be more enlightened and less vindictive, because the workers can often offer corrective ideas to solve problems.

I. Planned downtimes of similar character can be measured against a standard (equivalent downtimes should be of comparable duration). Production run times are often known, but change over (set-up) times are accepted as is for whatever turns out. Often, substantial equipment time can be lost during set-up time which could have been spent productively. In most cases, this set-up time is not comparatively monitored because real set-up times are based not on the new set-up alone, but the difference between the new and the previous setting. This invention has the capability of distinguishing the various categories of set-ups and establishing separate standards for the nuances of each. In addition, standards for any repetitive planned downtime can be established to monitor this out-of-control lost time.

BRIEF DESCRIPTION OF THE DRAWINGS

FIG. 1 (Prior Art) is a schematic view of a typical manufacturing production control logic circuit consisting of hardware and/or software components;

FIG. 2 is a schematic view of a motor control logic circuit of this invention, illustrating two modifications that may be made to the existing equipment illustrated in FIG. 1; and FIG. 3 is a schematic view of the conceptual logic of this invention external to existing equipment.

DETAILED DESCRIPTION OF A PREFERRED EMBODIMENT

Definitions:

Downtime: Any time manufacturing operations are not producing product.

Electronic Logic System (ELS): A PC and/or a PLC.

Manufacturing Production Equipment: Any electrical device, or plurality of devices, that modify a material in such a way as to make, or contribute toward making, a final product more marketable. (Used implicitly throughout this specification as being equivalent to manufacturing operations.)

Momentary Closed: Electrical contacts that remain electrically "off" until a pushbutton is pressed by an operator. As long as the button is pressed in, the contacts are closed (electrically "on"). When the button is released the circuit reopens. In software logic this functions as a close pulse.

Momentary Open: Reverse of Momentary Closed. Electrical contacts that remain closed (electrically "on") until a pushbutton is pressed by an operator. Then the contacts open (electrically "off") and remain open only as long as the button is held in. When the button is released the contacts reclose. In software logic this functions as an open (circuit-breaking) pulse.

Motor Control Starter Coil: The relay coil, whether actual hardware or embedded in software, that starts the device.

Motor Starter: Same as motor control starter coil.

PC: Personal computer, the common computer.

Planned Downtime: Anticipated downtime, such as at night, cleaning, lack of need, set-up time for a different product, preventive maintenance, etc.

PLC: Programmable logic controller, an electronic package that contains some or all of the following features: internal relays, timers, counters, logic, etc.; and external output relay contacts, analog control signal outputs, input terminal contacts, keyboard input interfaces, etc.

The Device: Same as manufacturing production equipment; the entity being monitored for downtime.

Unplanned Downtime: Unexpected downtime, such as occurs due to equipment breakage, lack of feed material, etc.

Referring now to FIG. 1, a typical manufacturing production control logic circuit may include the following hardware and/or software components:

Power supply source 10. This may be 120 volts, 24 volts, 12 volts, 5 volts, etc., using either alternating (AC) or direct (DC) current, as long as the voltage is compatible with the components.

Circuit completing common (or neutral) return leg 12 to complete the circuit back to the source.

Stop pushbutton (switch) 14. It can be either a single switch, or more than one, as shown. It is installed in series with the main logic circuit. It has been historically installed as momentary open hardware, but can also be built into software as safety allows. For example, it may consist of a momentary (press & release), normally closed style pushbutton used by the operator to stop the motor (or other device).

Start pushbutton (switch) 16. It can be either a single switch, or more than one, as shown. It is installed in parallel with the motor latching relay contacts 18 in the main logic circuit. It has been historically installed as momentary close hardware, but can also be built into software as safety allows. For example, it may consist of a momentary (press & release) normally open style pushbutton used by the operator to start the motor (or device).

Latching Relay Contacts 18. This is a normally open style auxiliary contact physically located adjacent to the motor starter coil (described infra). When the start button 16 is pressed, the motor starter coil is activated (as long as all the safeties are satisfied), the latching relay contacts 18 close and, because of these contacts 18, the motor keeps running after the start pushbutton 16 is released.

Safety Contacts 20. They can be normally open style (as shown) or normally closed, as logic warrants. They can be relay contacts, pressure switches, alarm contacts, etc. They are wired in series with the motor starter coil as shown but are typically installed in front of the stop button to minimize the length of hot wires. They are functionally correct but are shown here after the stop button 14 for schematic clarity. These can vary from none to an unrestricted count in number depending on the application. They can be either in hardware or embedded in software. They are typically used to assure that the safety and process parameters are, and remain, met.

Thermal overload protector such as a fuse 22 (shown) or circuit breaker.

Other Safety (or Operational) Devices 24: These include proximity switches (for guard-in-place, etc.), trip wires (to keep hands and bodies away, etc.) and other miscellaneous devices to shut the equipment off, which are not otherwise covered under safety contacts 20. Their physical location is as described for the safety contacts, supra.

Motor Starter Coil 26: This is a relay coil typically sold in a package to start a motor. It has three contacts for operating a three phase electrical motor. It is connected to a fourth pair of contacts 18 to latch the circuit closed for running. It occasionally has additional auxiliary contacts for logic use, in which case an extra coil (described infra) is not needed. The device has been called a motor for convenience throughout this schematic; but it can be any electrical device, such as a heater, solenoid, etc.

When the conditions have been met to satisfy all of the process/safety interlocks 20, 22, 24, momentary pressing of the start button 16 completes the circuit from power supply source 10 to common return leg 12 to turn on the motor control starter coil 26. The motor control starter coil 26 has multiple contacts, some of which start the device. The pair of normally open contacts 18 in parallel with the start button 16 are closed by the motor starter 26 to latch in (i.e., lock to the on position) when the start button 16 is released. These latching contacts 18 are what keeps the device running after the start button has been released.

A momentary (or longer) break in the circuit from power supply source 10 to common return leg 12 by pressing the stop button 14 or by opening any of the safety/process contacts (interlocks) 20, 22, 24 causes the motor control starter coil 26 to de-energize. When motor starter 26 de-energizes, the latching contacts 18 fall out (open). After the cause for the stoppage has been rectified, and all the permissive contacts (at stop button 14, safety contacts 20, fuse 22 and other safety devices 24) have been satisfied again, the device will not restart because the latching contacts 18 (which dropped out when the device was shut off) will remain open until the start button 16 is pressed again. This sequence is repeated as necessary to start and stop the device.

FIG. 2 is a schematic view of a motor control logic circuit of this invention, illustrating two modifications that may be made to the existing equipment of FIG. 1. The present invention introduces an additional pair of contacts as logic contacts 30 in series with the start button 16 and in parallel with the latching contacts 18. This contact arrangement is unusual since it only blocks the device from starting. It does not (unlike the safety/process interlocks) stop the device once it is running. Process/safety interlocks must stop the device in the fail mode, both from running as well as to prevent the device from starting, and are installed in series with the main logic circuit leg as described supra. These logic contacts 30 function as and will usually be normally open style, but could be physically normally closed style if logic conditions require it. Contacts 30 could be physically placed anywhere in the circuit, but logic will force the contacts 30 to behave as if placed where shown. They will never stop running equipment from running; they will only prevent stopped equipment from restarting.

Optionally, secondary relay coil 32 is a supplement to the motor start coil 26. The motor start coil 26 rarely has spare contacts. This new relay coil 32 merely expands the motor starter's contact capacity by two or more additional pairs of contacts. It is active when the motor is on. It closes the new logic contacts 30 and opens the motor status contacts 50 (described and illustrated in conjunction with FIG. 3, infra) when the motor comes on. It reverses the action when the motor drops out.

A possible concern of management is that, during retrofit installation of the inventive apparatus, any kind of tinkering might shut the production down. The fact that there are only two modifications, and both are simple, minimizes the risk of problems to existing equipment. Furthermore manual bypass contacts (not shown) can be temporarily installed to bypass the contacts 30 and keep all stations running until the system has been debugged.

The logic contacts 30 are controlled by a separate circuit. FIG. 3 is a schematic view of the conceptual logic external to the existing equipment, and includes the following components:

Decision Device 40: This may be either a PC (personal computer) or a PLC (programmable logic controller), depending on the situational needs.

Permissive coil 42: This coil closes the new logic contacts 30 installed in the existing equipment to allow the motor to start. Permissive coil 42 can also be used to close the status indicator contacts 46, infra.

Decision Device Contacts 44: When the decision device 40 is satisfied with the downtime cause input via keypad 52, it closes decision device contacts 44 to activate (start) the permissive coil 42. As soon as the motor stops, motor status contacts 50 advise the decision device 40 that the motor is down, and the decision device 40 opens these contacts 44.

Status Indicator Contacts 46: These contacts activate the status circuit. They are typically normally open style contacts as shown. They are controlled by the decision device 40 (for logic) and the permissive coil 42 (for hardware).

Status Condition 48: This can be as simple as an indicator light (as shown), and/or as sophisticated as a displayed message on a monitor or computer screen. It advises the operator that the inventive circuit has been satisfied, and the equipment is ready to go if everything else has been satisfied. It can be activated either by the status indicator contacts 46, or else directly from the decision device 40 itself.

Motor Status Contacts 50. These contacts are physically closed when the motor is running, and open when the motor stops. They can be normally closed style (as shown) or normally open style as long as the action is consistent with the logic.

Keypad 52: This MMI (man to machine interface) allows the operator to provide the required data.

Data is input by an operator via keypad 52 (or any other appropriate input means, such as touch-screen keypad, voice recognition, etc.). The data represents a codified or real description for the cause of an existing downtime. The input data is screened by electronic logic system 40 for acceptability. If rejected, the input data entered at the keypad may be cleared and new data entered. If the downtime event is of long duration logic allows multiple causes to be assigned proportionately to the downtime interval.

If the electronic logic system 40 passes the input data, it activates permissive relay coil 42 via a momentary pulse closure of normally open decision device contacts 44 in series with the permissive coil 42 (connected as necessary to hardware). Permissive coil 42 may include a pair of contacts 30 (FIG. 2) that close so the device start button 16 can operate when pressed, and a third pair of normally open contacts 46 that close to energize permissive indicator 48 (by light or displayed message).

The logic coil circuit can be completely software-based, hardware-based, or a mixture of hardware and software. Other related data can be entered as appropriate, e.g., at the start of the day, at the start of the batch, as employees change, or as keyed to process changes.

In its simplest format one digit (of 10) can be used at the keyboard 52 input to the electronic logic system 40 to indicate input cause of downtime data.

The inventive system thus provides a flip/flop circuit that mandates that a downtime entry be given in order to restart the device. Restarting the device clears out the downtime entry from being reused. Stopping the device requires another downtime entry in order to restart the device.

All the downtime duration data and causes, along with related data, may be gathered and sorted as per filter screens of a spreadsheet. Then this data may be tabulated and displayed in an appropriate database or spreadsheet, such as EXCEL 97, SQL or ACCESS.

Typical of an information system, there are three basic subdivisions. There is an input package, a transmission package and an output package. Since these packages may be utilized by various clients in various industries, no two systems will be identical. However, within each subdivision there are similarities. Existing equipment will generally be modified to include one extra set of permissive contacts to start each piece of equipment. The contacts will latch and stay latched until the equipment stops running by any means previously used to stop it, and then the latching logic will drop out. Other modifications may be necessary to gather additional data requested by the client (such as rates of operation, station step, etc.). However, they may follow a generalized program as described next, but custom-tailored to each need.

Modifications to Existing Equipment to Receive Input Data Start Boxes

Each "Monitored Piece of Equipment", also known as a "Unit Operation", will be referred to as a "Station" for the balance of this system description. Each station will receive a minimum modification, consisting of insertion of an additional pair of permissive contacts and feedback from the station starter confirming start-up. Furthermore, a new "Start Box" is connected to the "Input Data Gathering Base", both of which are totally independent of the client's existing system. There are two basic ways (personal computer or programmable logic controller) to provide a start station package. When PC's (Personal Computers) are used at a station, the Start Box and Input Data Gathering Box are likely to be together and dedicated.

PC inputs offer more choices because of their greater computing power. Typically there would be a normal computer screen and keypad. However, PC's can be modified to have a touch screen. Touching an area of the screen that looks like a button or other mnemonic image can often allow faster data flow. Voice recognition is an even more elegant choice when a hands-free input is needed.

PLC's (programmable logic controllers) can be used in place of PC's, and they are generally more rugged. PLC's are commercially available devices from Allen Bradley, Siemens Inc., and numerous other sources that consist of terminals for input and output data, both digital and analog; where the input data can be logically evaluated and processed against time, count and other data. Another way to look at it is to consider it to be a box of relays, timers, counters and constants that can be wired using a PC (once it has been wired the PC is no longer needed).

The PLC's are expected to be remote from their Start Boxes and would generally be expected to process data from multiple Start Boxes. The Start Box for PLC driven stations will typically consist of a keypad and brief display screen.

A client may request that production rates or other information be tagged to the downtime data. This will likely require other modifications to the existing equipment to intercept this information most conveniently for the operator. Other custom modifications may be required to meet individual customer requirements as they arise.

There are as many Start Boxes as there are (monitored) Stations in a factory.

Input System Package

Built into each station will typically be its identity. It will reside in its Input Data Gathering Base (IDGB). All data gathered from each of these stations will be tagged with the station identification. All downtime data will be later dividable into the tagged categories for sorting by tagged categories. Station identification will be built-in and will require no operator input.

When an operator first attempts to start the station via the new Start Box in a typical operation, he will be prompted to enter his employee number. The IDGB will verify each entry as eligible. Additional employee entries are permissible up to a limit established by the client for maximum employees/station for each station.

The next prompt is for a product code. The IDGB will check to verify if entry is eligible. If it is different from the previous entry, a downtime entry for cleaning may be confirmed as a permissive if desired by the client. A basic multi-client program may include many provisions like this, citing these optional features for inclusion or deletion. Deletion of these pre-written features can occur more easily at the time of client installation than adding custom code to a core program. Only one entry for a product code is allowed at a time.

The next prompt is for lot number. After checking for acceptance the standard program will query for an "Are you sure?" response from the operator if the lot number is not running sequentially with the previous numbers.

The last prompt is for the cause of the existing downtime, which at the beginning of the day is typically the code for: "Planned/Overnight." Pressing the Start Button now will start the equipment.

The IDGB permissive contacts will remain latched and the station will remain running as multiple employees come and go (as long as at least one remains logged on), and lot numbers may change without shutting down (if this is consistent with client-company policy).

However, once the station stops for any reason that it would have stopped for in the past, the latched contacts drop out. The IDGB detaches the run-enable mode and starts logging (off) downtime. The operator must enter a cause for the stoppage before the equipment can restart. The IDGB will verify the legitimacy of the entry and latch for restart. Depending on how the Start Box is configured, allowance can be made for custom messages to be typed in downtime. Multiple entries for entries for downtime causes are allowed, including entries identifying mechanical or non-mechanical downtime causes, or both, but the mandate is: at least one must be entered in order to continue.

Corrections to downtime causes may be typed in and transmitted to the IDGB prior to restarting. Once restarted the original data is erasable, but displayed in a modified font.

As soon as the new feedback coil acknowledges that the station is running again, the IDGB calculates the time interval that the station was down (alternatively, the differential time interval can be calculated on the spreadsheet or database processor). It also subdivides this interval by any other changes (staffing, etc.) that occurred during the downtime interval. All of this data is keyed to the start of the downtime and stored in the IDGB for transmission to a central data base.

An exception for restart blockages will be allowed in the set-up and related modes so as not to impede the set-up process. Appropriate limitations will prevent abuse of this bypass.

There are multiple Input Data Gathering Bases, albeit not necessarily as many as the Start Boxes, since multiple Start Boxes can be ganged onto single IDGB's.

Transmission Package

Depending on the capacity and format of the data highway used by the client, one can either install a new independent Local Area Network (LAN) or use the existing LAN system, or connect the input with the output database/spread sheet processor directly if the system is small enough. A description of some typical transmission systems follows:

A burst-mode transmission system functions as follows: Triggered by real clock time, midnight for example, all of the data that has been accumulated in the IDGB will be transferred to a storage disk for permanent filing and a duplicate will be sent to the Master Output Spreadsheet/Database Processor(s).

A dynamic transmission system functions on-the-fly as follows: Conversely, the trigger may merely be a change of state at the IDGB if the output is used as the workhorse for data manipulation and/or the IDGB's memory is limited.

Depending on final client system capacity, the LAN may split the output load into segments for output processing by more than one Output Spreadsheet/Database Processor (OSDP). The LAN will confirm the validity of the transmission, then stagger-erase (cascade disappearing data by holding it until verification of valid receipt before erasing the oldest data). After the LAN is satisfied it will command the local IDGB's to clear and reset their input logs. It will also command the OSDP(s) to start processing. The LAN will make one last confirmation of the IDGB instructions to confirm proper erasure and performance, and then it will go back to sleep. In other words, each time data is transmitted, it will be checked for valid transmission before erasing, and the data at the output will be recorded on tape or equivalent for a permanent record.

Besides the normal wake-up call of the LAN, it will be awakened by any detectable Priority 10 (highest) Failure of an IDGB for immediate network alarm transmission. It will also transmit category information (new employee names, new downtime causes, new lot numbers, etc.) from the OSDP's to the IDGB's as needed.

There is normally only one LAN required.

Output Spreadsheet/Database Processor

The Output Spreadsheet/Database Processor (OSDP) is a commercially available spreadsheet preprogrammed with macros and other software as needed to receive the transmitted input data, sort and organize it into a master format, and print these reports on a prescheduled time frame. Additionally, the structure can be organized so that sorting of downtime data can be presented in any tag priority sorting, on any time basis (capacity allowing).

It is preferable to leave the tag variables, and especially the Downtime Cause Tags, to be as accessible and free for client modification as possible.

Modem ports (controlled by the client) may allow remote troubleshooting of future problems that may occur to help the client reduce their maintenance costs of this system.

Benefits of the inventive method and system include:

1. Prior art downtime reports, such as they exist, do not segregate planned downtime from unplanned downtime. The present invention separates planned and unplanned downtime (based on the cause).
2. Presently, the causes for downtime come from operator recollections and/or scouring over cryptic batch notations such as they exist. This is after-the-fact data. The present invention couples entry of a downtime cause with blockage of restarting the device, and forces collection of timely (more accurate) data.
3. Collection of on/off data via an ammeter recorder or voltmeter recorder do not identify causes of downtime because they would be limited to only identifying causes that could be pre-programmed into them. This precludes all human-type errors and would limit the number of identifiable machine-caused downtimes to a uselessly small number in most cases.
4. Data entry can be as fast as a one key entry (for 0 through 8 general causes, 9 preferably being reserved for other data) for minimal delay of production resumption. Speed of data entry is important in that slow complicated data entries reduce the reliability of the data and extend the downtime by delaying restart of the device.
5. The data entry format, although geared for speed, can be quickly modified in the field at the electronic logic system for more detailed (e.g., expanded digit or narrative text) entries for trouble shooting when warranted.
6. Planned downtime, as well as the obvious unplanned downtime, can also be broken into categories in order to measure cleaning and set-up times.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. A method for collecting downtime data for powered manufacturing equipment, said manufacturing equipment adapted for starting, stopping, and restarting, said downtime data including manufacturing equipment shutdowns of both mechanical and non-mechanical nature, said method comprising the steps of:

connecting an independent electronic logic system to the manufacturing equipment;

electrically blocking the manufacturing equipment from restarting after stopping until an acceptable reason has been entered and recognized by the electronic logic system; and manually entering an acceptable reason into said electronic logic system to enable restarting of the stopped manufacturing equipment.

2. The method for collecting downtime data for manufacturing equipment of claim 1 wherein said manufacturing equipment includes a circuit interconnecting a power supply source, a stop switch, a start switch, a latching relay contact, a safety contact, and a motor starter coil, in which when conditions have been met to satisfy the safety contact, momentary pressing of the start switch completes the circuit to turn on the motor starter coil and start the equipment, said method further including the step of recording the entered reason for evaluation.

3. The method for collecting downtime data for manufacturing equipment of claim 1 wherein said step of electrically blocking the manufacturing equipment from restarting after stopping comprises mechanically blocking with electronic controls.

4. The method for collecting downtime data for manufacturing equipment of claim 1 further including the step of recording the duration of the downtime event.

5. A method for gathering and organizing downtime data for powered manufacturing equipment, said manufacturing equipment adapted for starting, stopping, and restarting, said downtime data including manufacturing equipment shutdowns of both a mechanical and non-mechanical nature, said method comprising the steps of:

connecting an electronic logic system to the manufacturing equipment;

electrically blocking the manufacturing equipment from restarting after stopping until an acceptable reason has been entered and recognized by the electronic logic system;

identifying the cause of said manufacturing equipment shutdown via human sense perception;

manually entering an acceptable reason into said electronic logic system to enable restarting of the stopped manufacturing equipment; and organizing and sorting said manually entered acceptable reasons with a spreadsheet on a time and priority basis.

6. A method for gathering downtime data for powered manufacturing equipment, said manufacturing equipment adapted for starting, stopping, and restarting, said downtime data including manufacturing equipment shutdowns of both a mechanical and non-mechanical nature, said method comprising the steps of:

connecting an independent electronic logic system to the manufacturing equipment;

programming said electronic logic system to recognize and accept a plurality of manually entered reasons for said manufacturing equipment downtime;

electrically blocking the manufacturing equipment from restarting after stopping until an acceptable reason has been entered and recognized by the electronic logic system;

identifying the cause of said manufacturing equipment shutdown via human sense perception; and manually entering an acceptable reason into said electronic logic system to enable restarting of the stopped manufacturing equipment.

7. A method for gathering and organizing downtime data for powered manufacturing equipment, said manufacturing equipment adapted for starting, stopping, and restarting, said downtime data including manufacturing equipment shutdowns of both a mechanical and non-mechanical nature, said method comprising the steps of:

connecting an independent electronic logic system to the manufacturing equipment;

programming said electronic logic system to accept a plurality of manually entered reasons for said manufacturing equipment downtime;

electrically blocking the manufacturing equipment from restarting after stopping until an acceptable reason has been entered and recognized by the electronic logic system;

identifying the cause of said manufacturing equipment shutdown via human sense perception;

manually entering an acceptable reason into said electronic logic system to enable restarting of the stopped manufacturing equipment; and organizing and sorting said manually entered acceptable reasons with a spreadsheet on a time and priority basis.

8. An apparatus for collecting mechanical and non-mechanical manufacturing equipment downtime data, said manufacturing equipment including a circuit switch, a latching relay contact, a safety contact, and a motor having a motor starter coil, in which the conditions have been met to satisfy the safety contact, momentary pressing of the start switch completes the circuit to turn on the motor starter coil and start the equipment, said apparatus comprising:

at least one pair of logic contacts connected in series with the start switch and connected to the latching relay contact to selectively block the manufacturing equipment from starting; and logic means for operating said at least one pair of logic contacts, said logic means being programmable for accepting a plurality of manually entered causes for machinery downtime, said logic means enabling the manufacturing equipment to restart upon manual entry of an acceptable reason into said logic means.

9. The apparatus for collecting manufacturing equipment downtime data of claim 8 wherein said at least one pair of logic contacts is connected in parallel with the latching relay contact.

10. The apparatus for collecting manufacturing equipment downtime data of claim 8 further including:

a relay coil connected to said logic contacts to close said logic contacts when the motor comes on, and open said logic contacts when the motor turns off.

11. A functional operations meter adapted for use as a comparator for measuring the benefit and detriment of operational conditions of manufacturing machinery and processes, said meter comprising:

data gathering means for collecting both mechanical and non-mechanical manufacturing equipment downtime data, said manufacturing equipment including a circuit switch, a latching relay contact, a safety contact, and a motor having a motor starter coil, in which the conditions have been met to satisfy the safety contact, momentary pressing of the start switch completes the circuit to turn on the motor starter coil and start the equipment, said data gathering means comprising at least one pair of logic contacts connected in series with the start switch and connected to the latching relay contact to selectively block the manufacturing equipment from starting, and logic means for operating said at least one pair of logic contacts to enable the manufacturing equipment to restart upon manual entry of an acceptable reason into said logic means.

* * * * *